UNITED STATES PATENT OFFICE.

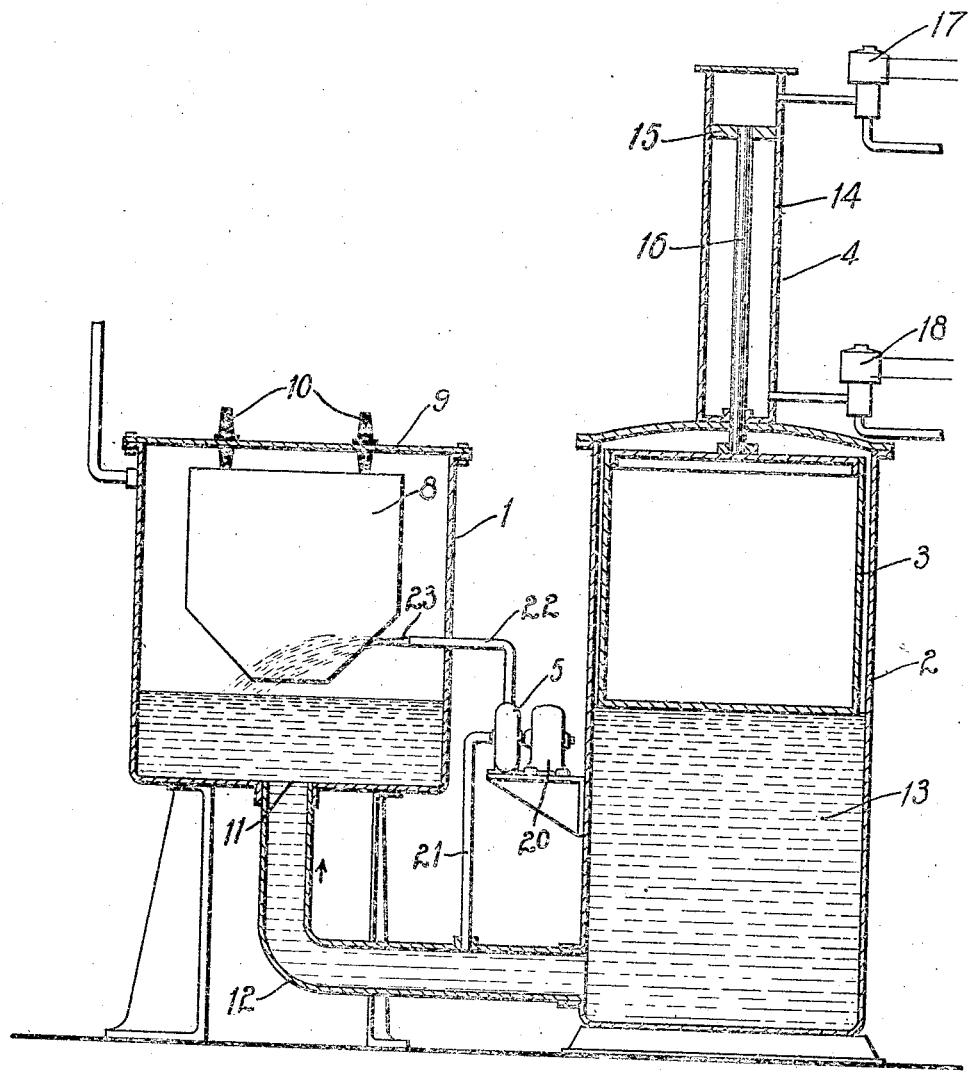

KARL A. SIMMON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

CONTROL APPARATUS.

1,258,050.

Specification of Letters Patent.

Patented Mar. 5, 1918.

Application filed October 9, 1914. Serial No. 865,833.

*To all whom it may concern:*

Be it known that I, KARL A. SIMMON, a citizen of the United States, and a resident of Edgewood Park, in the county of Allegheny and State of Pennsylvania, have invented a new and useful Improvement in Control Apparatus, of which the following is a specification.

My invention relates to control apparatus for dynamo-electric machines, and it has special reference to liquid rheostats.

One of the objects of my invention is to provide an apparatus of the above indicated character which shall be simple and compact in construction, effective and reliable in operation, and which shall be particularly adapted for manipulation with rapidity and accuracy.

Another object of my invention is to provide a liquid rheostat having separate means for concurrently supplying electrolyte thereto at relatively different rates, whereby a large body of electrolyte may be supplied to said rheostat to rapidly establish any desired approximate level, while a relatively small amount of electrolyte may be continuously supplied for the purpose of obtaining fine gradations and rises of electrolyte level and for cooling the electrodes.

In the prior art, it has been common to provide means for forcing a body of electrolyte upwardly into a rheostat tank and into contact with the electrodes contained therein. In this class of apparatus, however, provisions have not heretofore been made for effecting two independent rates of supply or for providing auxiliary means for maintaining the electrodes in a cool condition.

According to my present invention, I propose to accomplish these ends by employing a liquid rheostat which is associated with an electrolyte-containing reservoir having a movable plunger therein by means of which the electrolyte may be displaced and rapidly forced into contact with the electrodes of the rheostat. In conjunction therewith, I provide a pump or other suitable means for continuously supplying a relatively small body of electrolyte to said rheostat and for directing this auxiliary stream of electrolyte upon the electrodes. Obviously, any approximate electrolyte-level may be established very quickly by means of the movable plunger, while the exact level of electrolyte or the desired rate of rise may then be effected through the agency of the auxiliary stream, which also serves as a cooling medium for the electrodes.

The single figure of the accompanying drawing is a view, partially in section and partially in elevation, of a rheostat constructed in accordance with my invention.

Referring to the drawing, the apparatus shown comprises a rheostat tank 1, a main electrolyte-containing reservoir 2, a movable plunger 3, an operating device 4, and a circulating pump 5.

The liquid rheostat tank 1 contains a plurality of electrodes 8 that are supported by and insulated from a cover 9 by means of insulators 10. An opening 11 is provided at the bottom of the tank 1 to communicate with the lower end of the reservoir 2 by means of a pipe 12.

The plunger 3 within the main reservoir 2 may be of any desired construction but of less diameter than the reservoir and adapted to be raised and lowered in position by means of the operating device 4 in order to displace the main body of electrolyte 13 therein and rapidly force it upwardly into the rheostat tank 1 through the pipe 12.

The operating device 4 preferably comprises a cylinder 14 having a movable piston 15 therein which is mechanically associated with the plunger 3 by a piston rod 16 and the movements of which are controlled by a plurality of electrically operated valves 17 and 18, the latter being associated with the respective ends of the cylinder 14 to control the admission of a suitable operating fluid thereto and its release therefrom. Any other device for performing similar functions may, of course, be employed.

Associated with the main reservoir 2 is the circulating pump 5 of any known construction, which is preferably driven by an electric motor 20 but which, of course, may be operated by other means. The pump 5 is adapted to draw electrolyte from the reservoir 2 through a portion of the pipe 12 and a pipe 21, and to deliver the same in a stream through a pipe 22 and nozzle 23 directly upon the tips of the electrodes 8. The pump 5 is operated continuously and its speed may be determined by governing the operation of its driving motor 20 in any well known manner.

In operation, it is manifest that the approximate level of the electrolyte within the tank 1 may be quickly established by causing the operating device 4 to force the plunger 3 downwardly to the proper position, thereby causing the main body of electrolyte to be forced into the tank 1 at a rapid rate. Having established the approximate electrolyte level, the level may be raised at any desired rate by properly controlling the operation of the circulating pump 5. Thus, the operation may be controlled at will, while the tips of the electrodes are maintained in cool operating condition.

Obviously, modifications in the structural details and in the arrangement and location of parts may be effected without departing from the spirit and scope of my invention.

I claim as my invention:

1. In a liquid rheostat, the combination with a tank having electrodes therein, of a plurality of separate means for concurrently supplying electrolyte to said tank at different rates.

2. In a liquid rheostat, the combination with a tank having electrodes therein, of means for supplying electrolyte to said tank and for rapidly varying the level thereof, and means for continuously supplying a small body of electrolyte thereto and for effecting a relatively slow rise of electrolyte level therein.

3. In a liquid rheostat, the combination with a tank having electrodes therein, of means for concurrently supplying electrolyte to said tank at two different rates.

4. In a liquid rheostat, the combination with a tank having electrodes therein, of means for supplying electrolyte from a common source to said tank through a plurality of paths at relatively different rates.

5. In a liquid rheostat, the combination with a tank containing electrodes, of means for rapidly supplying a large body of electrolyte thereto, and means for concurrently and continuously supplying a relatively small body of electrolyte thereto.

6. In a liquid rheostat, the combination with a tank containing electrodes, of means for rapidly raising a large body of electrolyte into said tank and into contact with said electrodes, and other independent means for supplying a relatively small body of electrolyte to said tank.

7. In a liquid rheostat, the combination with a tank containing electrodes, of means for supplying a large body of electrolyte to said tank, and separate and independent means for supplying a relatively small body of electrolyte thereto.

8. In a liquid rheostat, the combination with a tank having electrodes therein, an electrolyte-containing reservoir, and means associated therewith for rapidly forcing electrolyte from said reservoir into said tank, of means for concurrently supplying a relatively small stream of electrolyte to said tank.

9. In a liquid rheostat, the combination with a tank having electrodes therein, an electrolyte-containing reservoir, and means associated therewith for rapidly forcing electrolyte from said reservoir into said tank, of separate auxiliary means associated with said reservoir for continuously supplying a relatively small body of electrolyte to said tank.

10. In a liquid rheostat, the combination with a tank having electrodes therein, an electrolyte-containing reservoir, and means associated therewith for forcing a large body of electrolyte upwardly into said tank and into contact with said electrodes, of other means for continuously directing a stream of electrolyte upon the ends of said electrodes.

11. In a rheostat, the combination with a tank having electrodes therein, an electrolyte-containing reservoir, and a plunger located within said reservoir and adapted to force electrolyte into said tank, of a pump for supplying additional electrolyte to said tank.

12. In a rheostat, the combination with a tank having electrodes therein, an electrolyte-containing reservoir, and a plunger located within said reservoir and adapted to rapidly force a large body of electrolyte into said tank, of a means for continuously supplying a relatively small body of electrolyte to said tank.

13. In a rheostat, the combination with a tank having electrodes therein, an electrolyte-containing reservoir, a plunger within said reservoir, and means for actuating said plunger to rapidly force a large body of electrolyte into contact with the electrodes of said tank, of other means for continuously directing a relatively small stream of electrolyte upon said electrodes.

14. In a liquid rheostat, the combination with a tank and electrodes contained therein, of a main electrolyte-supplying system, and auxiliary means embodying a pumping device for continuously supplying a stream of electrolyte upon said electrodes for cooling purposes.

In testimony whereof, I have hereunto subscribed my name this 30th day of Sept., 1914.

KARL A. SIMMON.

Witnesses:
G. R. Irwin,
B. B. Hines.